United States Patent [19]

Traylor et al.

[11] 4,126,406

[45] Nov. 21, 1978

[54] COOLING OF DOWNHOLE ELECTRIC PUMP MOTORS

[75] Inventors: Francis T. Traylor; Frank J. Vatalaro; Bert Benear, all of Bartlesville, Okla.

[73] Assignee: TRW Inc., Cleveland, Ohio

[21] Appl. No.: 722,768

[22] Filed: Sep. 13, 1976

[51] Int. Cl.$^2$ ............................................. F04B 39/06
[52] U.S. Cl. ...................................... 417/373; 310/64; 310/87
[58] Field of Search ................. 417/366, 367, 373; 310/53, 58, 64, 87; 415/521

[56] References Cited

U.S. PATENT DOCUMENTS

| | | | |
|---|---|---|---|
| 2,283,118 | 5/1942 | Arutunoff | 417/367 |
| 2,764,943 | 10/1956 | Peters | 417/373 X |
| 2,776,385 | 1/1957 | Modrey | 310/58 X |
| 2,783,400 | 2/1957 | Arutunoff | 417/424 X |
| 2,829,286 | 4/1958 | Britz | 417/373 |
| 3,388,724 | 6/1968 | Mowell et al. | 138/149 X |
| 3,468,258 | 9/1969 | Arutunoff | 166/212 X |
| 3,672,795 | 6/1972 | Arutunoff et al. | 417/424 |

Primary Examiner—Carlton R. Croyle
Assistant Examiner—R. E. Gluck
Attorney, Agent, or Firm—Shapiro and Shapiro

[57] ABSTRACT

Efficient downhole cooling of the electric pump motor, motor protector, and thrust bearing of a submergible pump assembly in a high temperature environment is accomplished without significant modification of the pump assembly itself. Coolant flows through an insulated shroud as a high velocity annular fluid sheet surrounding the components to be cooled. In a closed loop system, coolant from a heat exchanger is supplied to the shroud via insulated supply tubing, which contains a cable for energizing the motor, is injected into the shroud by a coolant discharge head from which the pump assembly is suspended, and returns to the heat exchanger via insulated return tubing. The walls of the shroud and tubing include expansion element which accommodate the difference between interior and exterior temperatures.

11 Claims, 4 Drawing Figures

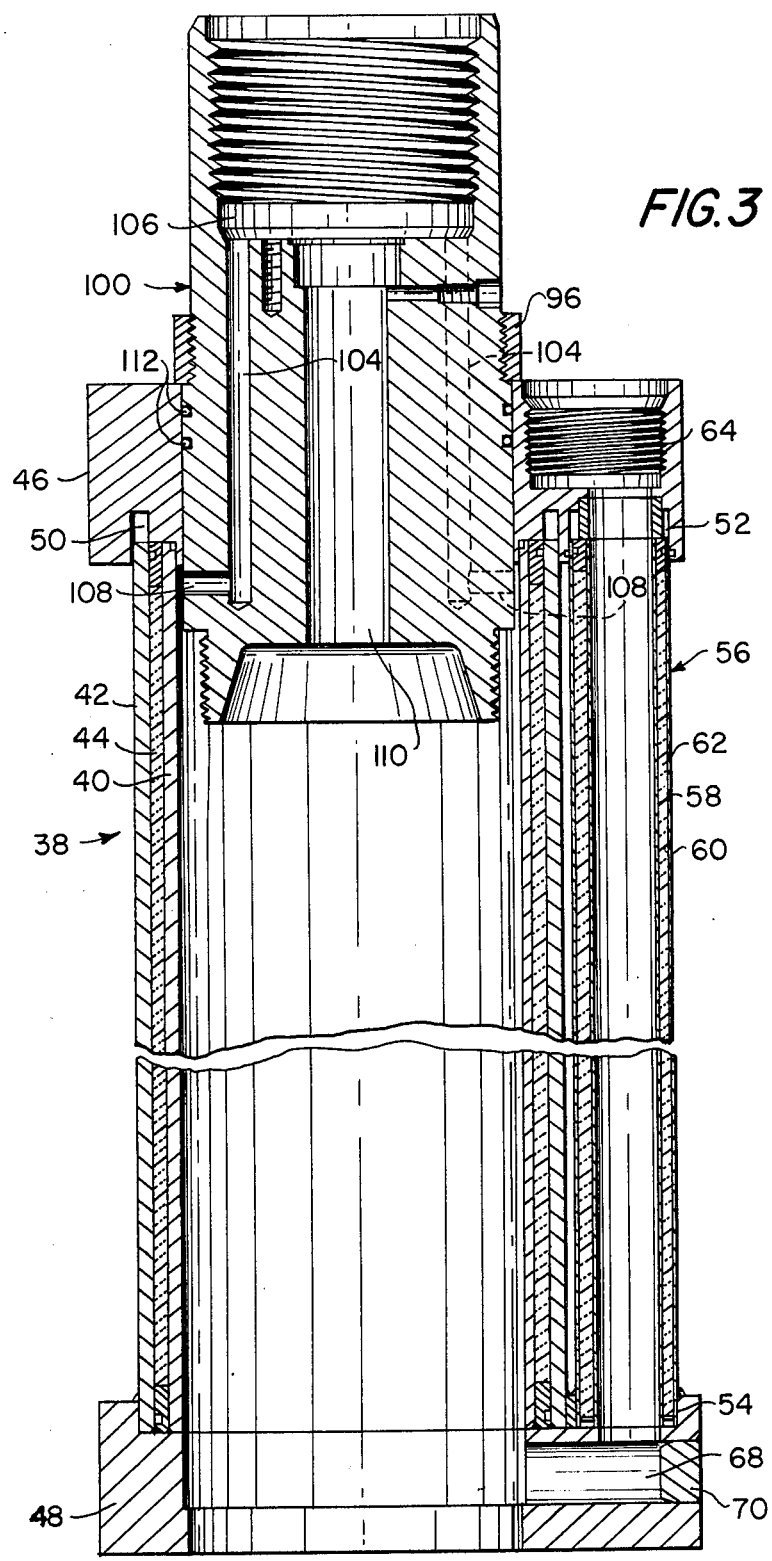

COOLING OF DOWNHOLE ELECTRIC PUMP MOTORS

BACKGROUND OF THE INVENTION

This invention is concerned with cooling downhole electric pump motors and associated apparatus in high temperature environments.

It has been conventional practice to employ ambient-temperature well fluid as a medium for dissipating the heat generated by the electric motors of submergible pumps. In wells with ambient downhole temperatures of up to about 250° F., this technique has been satisfactory. With substantially higher downhole temperatures, e.g. 300° F.-500° F., as may be encountered in geothermal wells, the well fluid is too hot to serve as the required heat dissipation medium, and the insulation, lubricant, and bearing materials of commercially available pump assemblies suffer from the effects of high temperature. It has, of course, been known to circulate coolants through electric motors, but such techniques have certain complexities, including, usually, the need for specialized motor or heat exchanger structures.

BRIEF DESCRIPTION OF THE INVENTION

It is a principal object of the present invention to provide adequate cooling of downhole electric motors and associated apparatus in high temperature environments without significant modification of commercially available submergible pump assemblies.

Briefly stated, but without intent to limit the scope of the invention, a preferred embodiment of the invention employs a shroud having an insulated tubular wall providing a chamber enveloping the downhole electric motor, motor protector and thrust bearing of a submergible pump assembly. A coolant, preferably water, is circulated through the shroud via insulated coolant supply and return tubing, the former being coupled to the interior of the shroud by a coolant discharge head and the latter being coupled to the interior of the shroud by an exhaust port. The coolant flows through the shroud as a high velocity annular sheet surrounding the cooled apparatus and is then returned to a heat exchanger at the earth's surface, from which the coolant is pumped into the supply tubing. The pump assembly is suspended from the supply tubing by the coolant discharge head. An electric cable for energizing the pump motor is contained in the supply tubing and is spliced to lead-in conductors of the motor in a chamber of the coolant discharge head. Thermal expansion effects are accommodated by expansion elements associated with the walls of the tubing and the shroud.

BRIEF DESCRIPTION OF THE DRAWINGS

The invention will be further described in conjunction with the accompanying drawings, which illustrate a preferred and exemplary embodiment, wherein:

FIG. 3 is a contracted longitudinal sectional view of the shroud, coolant discharge head and return tubing.

DETAILED DESCRIPTION OF THE INVENTION

Figure 1:
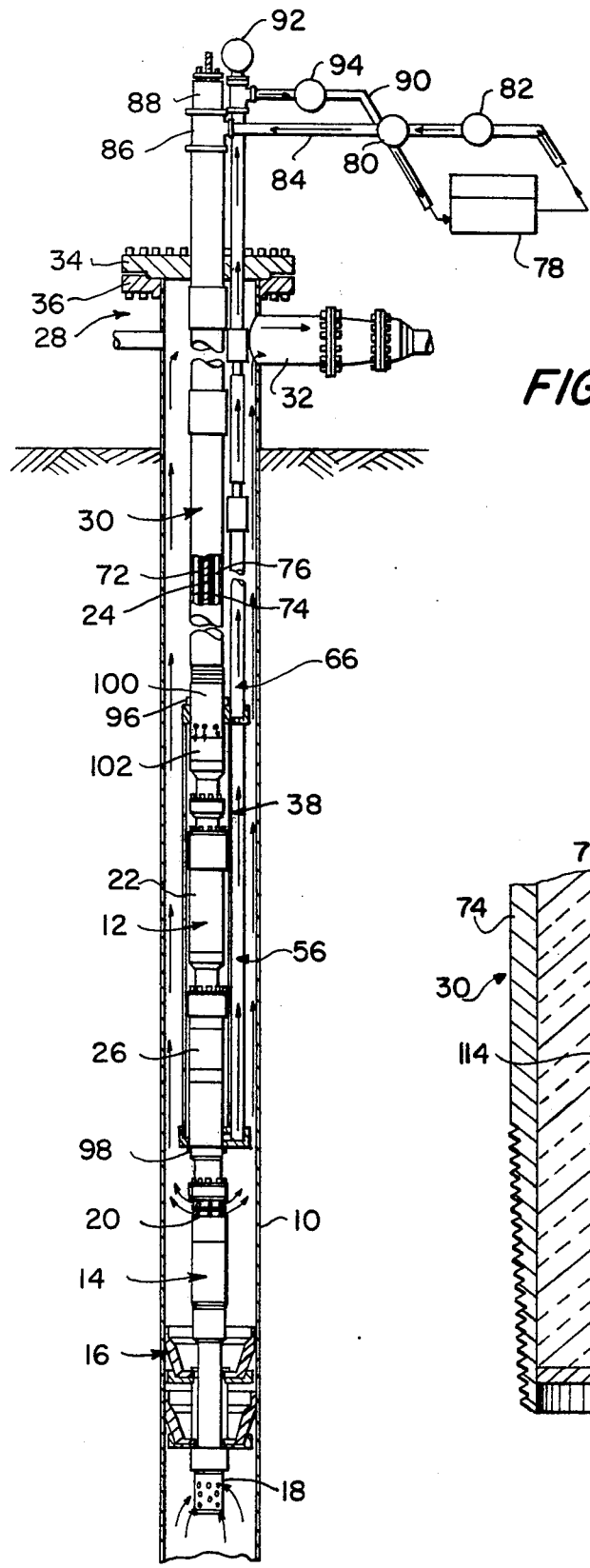
FIG. 1 is a diagrammatic longitudinal sectional view illustrating apparatus of the invention in a well.
Figure 2:
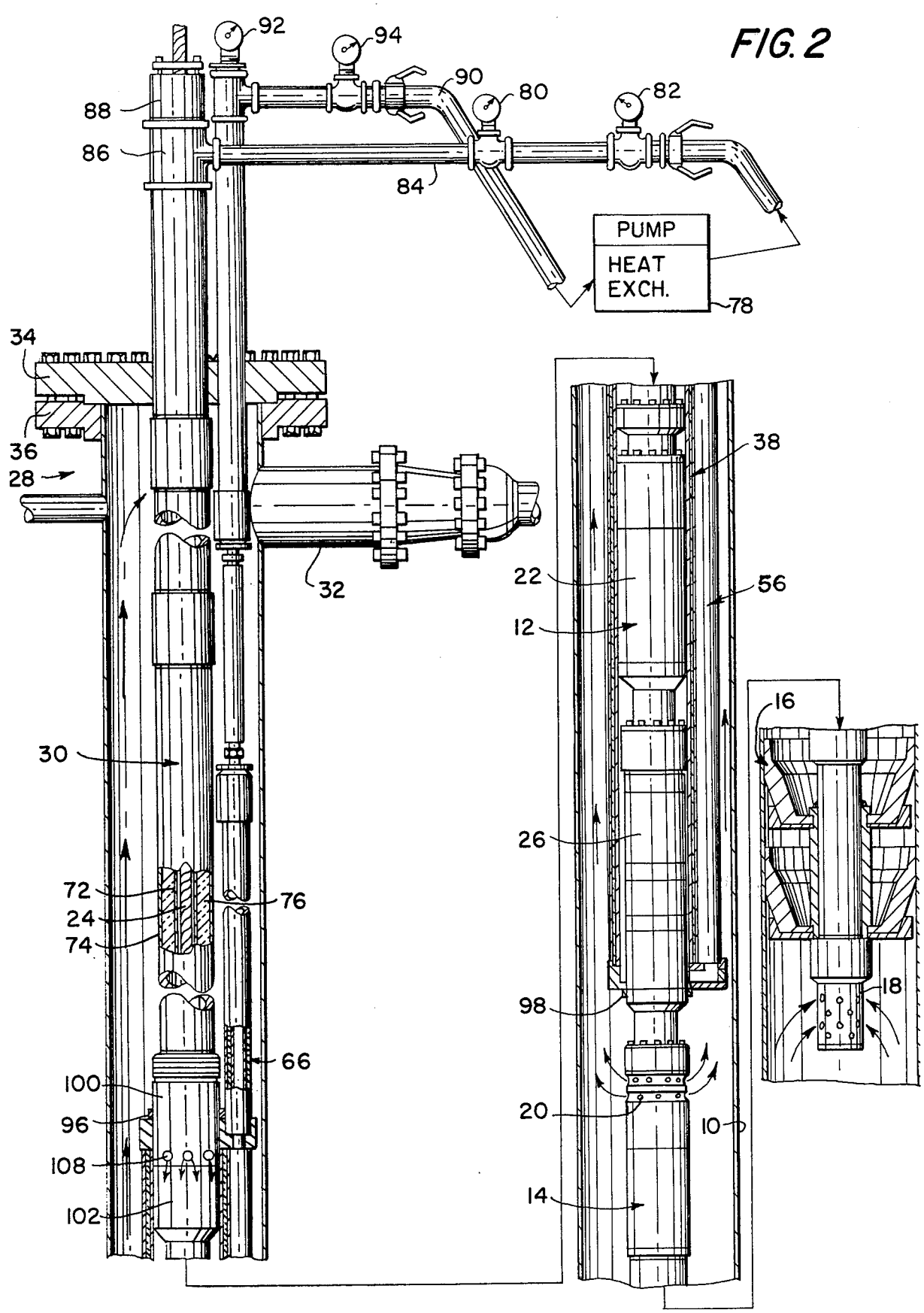
FIG. 2 is a further view of the apparatus of FIG. 1 shown enlarged and broken into sections for convenience of illustration.

Referring to the drawings, and initially to FIGS. 1 and 2, the invention is shown, for purposes of illustration, in its application to a geothermal well having a well casing 10 in which a submergible pump assembly 12 is located downhole. The pump assembly comprises a submergible pump 14, which may be of the well-known centrifugal type, for example, and a pump motor and motor protector described hereinafter. A conventional packer 16 separates a first portion of the well, at which an intake nipple 18 of the pump is located, from a second, higher pressure portion at which the well fluid discharge head 20 of the pump is located.

Pump 14 is driven by an electric motor 22, which is connected by an electrical cable 24 to an electrical power source at the earth's surface. The motor may be a well-known oil-filled type, for example. A conventional motor protector 26, which may be of the type shown in U.S. Pat. No. 2,783,400, for example, is shown interposed between the motor 22 and the pump 14 and contains a thrust bearing (not shown) which may be of the type shown in the aforesaid U.S. patent, for example. Submergible pumps, electric pump motors, and motor protectors suitable for use in the invention are manufactured and sold by Reda Pump division of TRW, Inc., the assignee of the present invention. Details of such apparatus may be found in the following U.S. Pat. Nos., in addition to that noted above, all of which are assigned to the same assignee and are incorporated herein by reference: 2,236,887; 2,251,816; 2,270,666; 2,283,118; 2,315,917; 3,433,986; and 3,468,258. Other types of submergible pump assemblies may also be utilized in the invention.

In the form shown, the pump assembly is suspended from a wellhead 28 at the earth's surface by means of suspension tubing 30. The wellhead includes a well fluid discharge pipe 32 and the usual flanges 34 and 36. It will be noted that in the preferred embodiment of the invention the pump is at the bottom of the pump assembly, i.e., below the motor, rather than above the motor as is frequently the arrangement in submergible pump assemblies. The preferred arrangement, with the motor at the top of the pump assembly, is significant in reducing the complexity required for adequate cooling, as will become apparent hereinafter.

In accordance with the preferred embodiment of the invention, motor 22, motor protector 26 and the thrust bearing therein, are surrounded by a shroud 38. As shown in FIG. 3, shroud 38 has an insulated tubular side wall comprising coaxial inner and outer walls 40 and 42 (e.g., 6 inch O.D. × 5.625 inch I.D. and 7 inch O.D. × 6.500 inch I.D. steel tubing, respectively) separated by insulation 44, which may be of Foamglas, for example. The side wall extends between and is connected to upper and lower annular end pieces 46 and 48, as by welding. The space between inner and outer walls 40 and 42 is sealed by appropriate sealing means to maintain the insulation dry and may also be pressurized. An annular slot 50 in end piece 46 accommodates thermal expansion of outer wall 42 with respect to inner wall 40. End pieces 46 and 48 have recesses 52 and 54 into which opposite ends of a section of coolant return tubing 56 are received and sealed. The coolant return tubing is also insulated, comprising coaxial inner and outer walls 58 and 60 (which may be of steel tubing) separated by insulation 62, which may be of the same type as that employed in the shroud. Again the insulation is sealed from ambient to maintain it dry. A threaded receptacle 64 in the upper end piece 46 receives the threaded lower end of a further section 66 of similarly constructed coolant return tubing as shown in FIGS. 1 and 2. The lower end of section 56 communicates with the interior of the shroud through a coolant exhaust port 68, which may be drilled radially into end piece 48 and blocked externally by a plug 70.

As shown in FIG. 2, in the illustrative form of the invention the suspension tubing 30 for the pump assembly is employed as the coolant supply tubing. Tubing 30 is also coaxial, comprising inner and outer walls 72 and 74 separated by insulation 76. The construction of the supply tubing 30 may be similar to the return tubing, but in the form shown the central passage within wall 72 is large enough to accommodate electrical cable 24 and yet provide a space surrounding the cable for the flow of coolant. Other tubing arrangements may be employed but the tubing, like the shroud, must be insulated to prevent heat exchange between the coolant and the well fluid. In a closed loop system, the coolant, preferably water, is delivered from a heat exchanger at the earth's surface by a coolant pump, as indicated diagrammatically by block 78. Suitable pressure and temperature gauges 80 and 82 may be provided in the supply line 84 delivering the coolant to a coolant injection tee 86 at the top of suspension tubing 30. Cable 24 enters the suspension tubing through a conventional cable seal 88. The coolant return line 90 may also be provided with pressure and temperature gauges 92 and 94. While it is apparent that in the preferred form of the invention a closed loop coolant circulating system is employed, isolating the coolant from the well fluid and avoiding the need for supplying large quantities of coolant, in theory the coolant could be discharged after one pass through the shroud.

Figure 4:
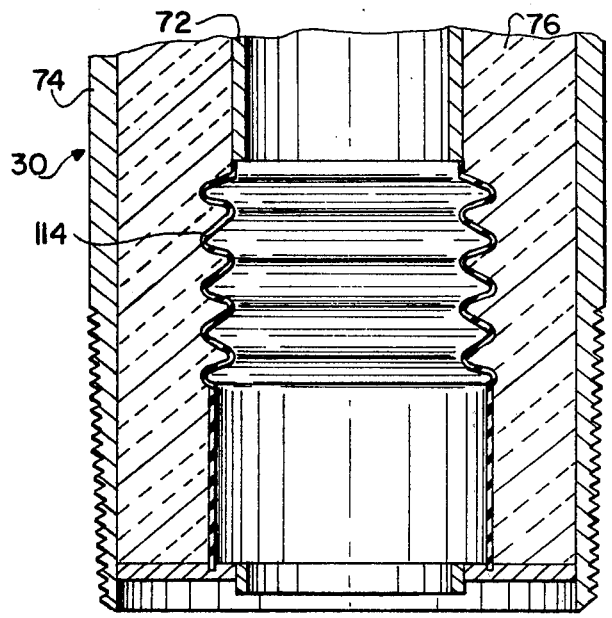
FIG. 4 is a fragmentary longitudinal sectional view of a portion of the tubing including an expansion member.

Shroud 38 is supported upon pump assembly 12 by conventional means, such as rings 96 and 98 threaded onto or otherwise attached to shroud-supporting components at opposite ends of the shroud. In the illustrative embodiment ring 98 is attached to the lower end of protector 26 (which is sealed into lower end piece 48 by conventional seals), while ring 96 is attached to a coolant discharge head and cable connecting chamber 100. As shown in FIG. 3, this member is a sleeve, which may be internally threaded at the top for receiving external threads at the lower end of suspension tubing 30 and which may be externally threaded at the bottom for engagement with the internal threads of an adaptor 102 (FIF. 2) by which the pump assembly is suspended from the coolant discharge head 100. Plural coolant distributing passages 104, spaced circumferentially of the coolant discharge head for uniform distribution of coolant, extend longitudinally from a chamber 106 beneath the lower end of the suspension tubing and terminate in transverse bore portions 108 leading radially to the exterior of the coolant discharge head, which is spaced from shroud wall 40 for discharging coolant into the shroud 38. The major exterior surfaces of the motor and the protector are spaced slightly from the interior surface of the shroud side wall to provide a thin annular flow passage, the thickness of which is orders of magnitude less than the diameter of the components to be cooled. Lead-in conductors for energizing motor 22 extend through a central bore 110 and are spliced to the lower end of the conductors of cable 24. A conventional cable seal (not shown) is provided to prevent the coolant from entering bore 110. A typical lead-in arrangement is shown in U.S. Pat. No. 2,283,117, assigned to the assignee of the present invention and incorporated herein by reference. O-rings 112 seal the coolant discharge head into the upper end piece 46 of the shroud. The interior of the shroud is thus isolated from the well fluid. To maintain tubing insulation isolated both from the well fluid and the coolant, an expansion member 114, such as a bellows, is employed in each length of tubing, as shown in FIG. 4 to permit relative movement of the inner and outer walls to accommodate the difference between exterior and interior temperatures. Conventional seals may be employed between successive lengths of tubing.

By virtue of the invention, effective cooling of downhole electric motors and associated apparatus in high temperature environments is accomplished without substantial modification of commercially available pump assembly components. The arrangement of the shroud, coolant discharge head, and pump assembly, with the pump at the bottom, permits simple suspension of the pump assembly and energization of the pump motor while providing the desired cooling. The provision of a thin annular flow space between the shroud wall and the cooled apparatus insures sufficient flow velocity for adequate heat dissipation, without internal modification of the cooled components, and the thermally insulated shroud wall and coolant conduit prevent undesirable heat exchange between coolant and well fluid, providing practical cooling without requiring large quantities of expensive coolant. Although the invention has been described in its principal intended application to cooling of downhole electric motors and associated apparatus, modifications within the scope of the invention will be apparent to those skilled in the art. For example, under appropriate conditions, heat might be supplied rather than removed.

The invention claimed is:

1. In combination with a submergible pump assembly having means for suspending the pump assembly downhole in a well and including an electric pump motor, a motor protector, and a pump at the bottom of the assembly, cooling apparatus for the motor and motor protector and comprising a tubular shroud surrounding the exterior surface of the motor and the motor protector at the downhole location of the pump assembly and providing interiorly of the shroud and exteriorly of the motor and the protector a chamber above said pump isolated from the exterior of the shroud, said chamber having an insulated side wall, a coolant discharge head at one end and a coolant exhaust port at the other end, and insulated conduit means extending downhole in the well to the shroud for circulating coolant through said chamber via said discharge head and said exhaust port, the coolant discharge head being located in a downhole location at the top of said shroud and having means for distributing coolant around the interior of the shroud, and said pump assembly being suspended from said coolant discharge head.

2. The combination of claim 1, wherein said conduit means comprises coolant supply tubing suspending said coolant discharge head therefrom and containing an electrical cable for energizing said motor, and wherein said coolant discharge head includes a chamber for the splicing of conductors of said cable to lead-in conductors of said motor.

3. The combination of claim 2, wherein the side wall of said shroud and the walls of said conduit means include expansion members for accommodating thermal expansion.

4. The combination of claim 1, wherein a section of coolant flow tubing extends from said port to said one end of said shroud exteriorly of said shroud and wherein said conduit means comprises a supply conduit coupled to said discharge head and a return conduit connected to said section of tubing.

5. The combination of claim 1, wherein said insulated side wall comprises inner and outer walls separated by insulation.

6. The combination of claim 5, wherein said shroud has means for permitting thermal expansion of one of said inner and outer walls relative to the other.

7. The combination of claim 1, wherein said conduit means is connected in a closed loop cooling system including a heat exchanger.

8. The combination of claim 7, wherein said conduit means comprises insulated tubing connecting said shroud to said heat exchanger.

9. The combination of claim 8, wherein said insulated tubing comprises inner and outer walls separated by insulation and has expansion means for permitting thermal expansion of one of said walls relative to the other.

10. The combination of claim 1, wherein the major exterior surfaces of the motor and the protector are closely spaced from the inner surface of the insulated shroud side wall to provide a thin annular high velocity coolant flow passage, the thickness of said passage being orders of magnitude less than the diameter of the motor and the protector.

11. The combination of claim 1, wherein the pump has an intake at its bottom and a discharge head at its top located at separated portions of the well.

* * * * *